E. Marx,
Fire Engine,

Nº 4,316.        Patented Dec. 20, 1845.

Witnesses;
Inventor;
Ernest Marx

UNITED STATES PATENT OFFICE.

ERNEST MARX, OF NEW YORK, N. Y.

FIRE-ENGINE.

Specification of Letters Patent No. 4,316, dated December 20, 1845.

*To all whom it may concern:*

Be it known that I, ERNEST MARX, a native of Germany, resident more than one year next preceding the date hereof in the United States and having duly made oath of my intention to become a citizen thereof, residing at New York, N. Y., have invented and made and applied to use, certain new and useful improvements in the construction, arrangement, and combination of the parts used in what are usually and technically known as "fire-engines," the intent of said improvement being to attain a means of making the operative parts larger and combining therewith a mode of applying a greatly-increased numerical manual power, and by these combined operations adding importantly to the strength and volume of water thrown on a fire, for which improvements I seek Letters Patent of the United States, and that the construction, arrangement, and combinations constituting the said improvements are fully and substantially set forth and shown in the following description and in the drawing annexed to and making a part of this specification, wherein—

Figure 1, is a general elevation of an engine as made by me in place for transport. Fig. 2, is a plan of the operative parts taken as at the horizontal line A, B, Fig. 1. Fig. 3, is a vertical section of the parts at the line C, D, Fig. 2.

The other figures are separately referred to, and the same letters and numbers as marks of reference apply to the like parts in all the several figures.

H, is an external box covering the whole of the parts and E, is the main body of the engine supported by the hind axle shaft $f$, and hind or larger wheels $a$, $a'$ and the fore shaft $s$, $s$, and forewheels $b$, $b'$. The shaft $f$ is made square between the hubs or naves of the larger wheels except where it is turned to form journals lodging in boxes secured beneath the side frame of the body and between that and the wheels it is square to receive a corresponding eye on the heads of the arms $c$, $c'$ placed between the wheels and body thus allowing the wheels when traveling to run either on their own turned axles on the ends of the shaft $f$, or with the shaft in the journal boxes under the body. On the outside of each large wheel a lever $d$ or $d'$, is made with a head large enough to be countersunk and to receive the outerpart of the hub of each wheel and in this situation a large screw $c^2$, or $c^3$, having a crank pin head is first put through the arm $d$ or $d'$ and secured between any two spokes of either wheel into the arm $c$, or $c'$ and then the jointed brake rod $e$, or $e'$, is fixed to the screw pin $c^2$, or $c^3$, and lying lengthwise of the machine terminates in handles $e^2$, $e^3$, $e^4$, $e^5$, but may be made with projecting handles on the outer side and have ropes attached to the handles by which any convenient number of men can conjointly work to communicate their power through the wheels to the machinery within the body the first part of which is a pinion $g$, on the shaft $f$, this gears into a spur wheel $h$, set on a shaft, 1, supported in journals 2, 2, on the standards 3, 3, the shaft 1, is fitted with a crank $i$, or $i'$, at each end, set at right angles to each other and having each a connecting rod $j$ or $j'$ to the piston rods $k$, $k'$, which pass through common stuffing boxes to the square pistons or plungers $l$, $l'$, in the piston chambers F, and F'. At the ends of these chambers are the common flap induction valves 4, 5, 6, 7, which open inward to the chambers F, F', and admit the water from the wells $o$, $o'$, $o^2$, $o^3$, and these are kept full from the water in the chamber or cistern G, above the wells and piston chambers, the water itself may be supplied from a hydrant or other supply through openings $p$, $p$, made and fitted in any usual form that will serve the purpose intended, the water thus admitted into each chamber is shut in by the valves 4, 5, 6, 7 closing when either piston has ceased moving in the opposite direction and on the piston commencing the return motion the water is forced out through the eduction valves 8, and 9, Fig. 3, the two corresponding valves on the other chamber are not seen in the drawing but which parts open into the chamber $m$, above, this is fitted with an exit pipe $n$, and air vessel and nozzle to the leading hose in the usual way. An oil cup $q$, and pipe 12 conducts a supply of oil to the joints of the connecting rod and piston rod.

At the hinder end an apparatus shown in elevation in the detached Fig. 6 is fitted to lift the hind wheels from the ground. In this $r$ is a vertical tooth rack frame and cross shoe to lift the engine and raise the wheels by the crank handle 13, and pinion $s$.

On the outsides of the frame $r$, two blocking pieces $t, t,$ are jointed so as to turn up under the engine bed and hold it and the wheels off the ground and to counteract any longitudinal strain on these supporters when working the engine a pair of diagonal bracing stays $u, u,$ are jointed at one end to the frame $r$ and at the other by a slide 14 to the bottom of the body with a slot receiving a screw clip 15 to secure them in place when in use. At the other end of the body the crank handle 17, works a tooth wheel not seen in the drawing but which gears into a tooth rack in the frame $r^1$ which sets down on the axle shaft $s^1$, of the fore wheels $b$, and the frame $r^1$, is fitted with blockers $t^1$, diagonal stays $w^1$, slide 18, and clip screw 19 serving the same purpose as the similar apparatus on the hind part of the body and when thus fitted and in place for use with the hind wheels raised from the ground the mode described of attaching manual power to the brake rods $e, e^1$, by the addition of ropes enables a great number of men to work at the engine and each hind wheel is converted into a fly wheel aiding the operations by its weight and momentum and the cranks $i, i^1$, being at right angles no dead point can occur in working the engine so that any number of men who can conveniently take hold can communicate their power through the pinion and spur wheel to the cranks and pistons and by the double action of these deliver a very large quantity of water through the exit pipe and nozzle. At $s^2$, is the tongue or lever whose power to draw and guide the carriage may be applied as usual.

Figure 4:
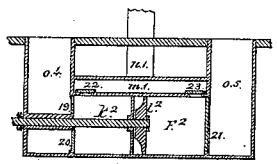
Fig. 4 shows one variation in the mode of fitting the action parts. In this $k^2$, is the piston rod $l^2$, the piston $F^2$, the piston chamber, 19, 20, 21, are three induction valves from the wells $o^4$, $o^5$, and 22, 23, are the eduction valves to the chamber $m^1$, and pipe and nozzle $n^1$.
Figure 5:
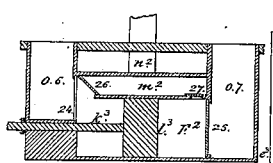
Fig. 5 shows a second variation in the same part. In this $k^3$, is the piston rod $l^3$, the piston $F^3$ the piston chamber $o^6$, $o^7$ the wells, 24, 25, the induction valves 26, 27, the eduction valves to the chamber $n^2$, and pipe and nozzle $n^2$.
Figure 3:
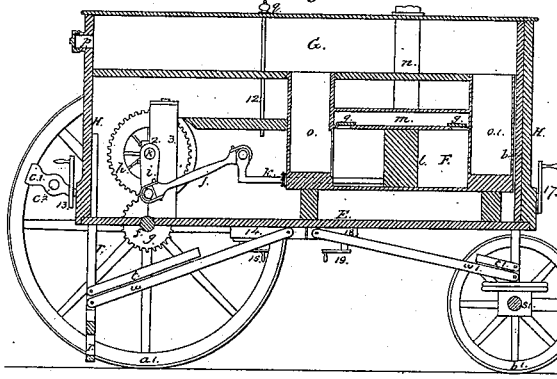
Figure 2:
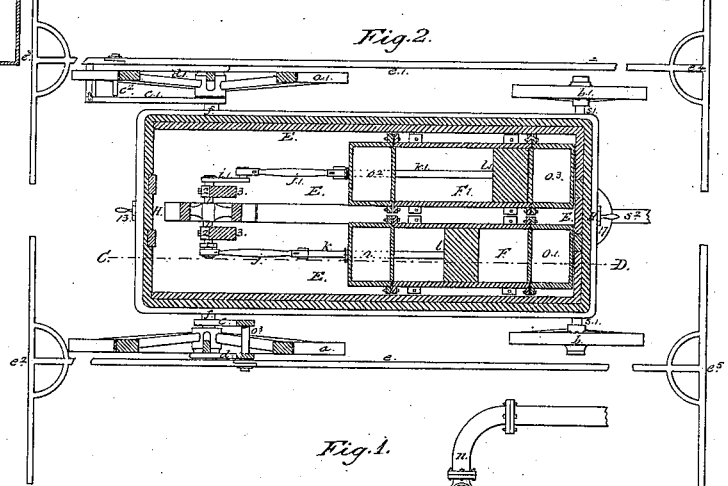
Figure 6:
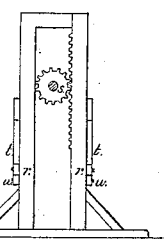
Figure 1:
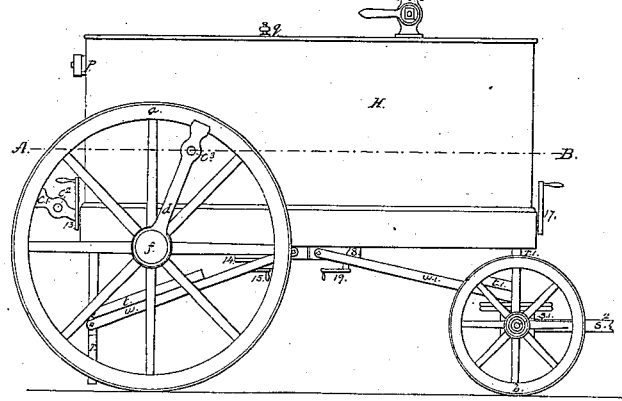

In all these figures the pistons and their chambers are supposed to be square instead of round though round chambers and pistons may be used if deemed advisable and made as shown in Fig. 4.

I do not claim to have invented any of the several parts described herein as used by me for these enjoined purposes as each part taken separately is well known. But

I claim as new and of my own invention and desire to secure by Letters Patent—

1. The mode of applying the rack frame, and lifting shoe $r$ and tooth wheel $s$ to raise the hind wheels from the ground in combination with the action of the blockers $t, t,$ stays $u, u,$ slide 14, and screw clip 15, to hold the engine in place for working.

2. And I claim the mode described of fitting the arms $c, c^1,$ and levers $d, d^1$ and connecting the same by the crank pin headed screw $c^2, c^3,$ to receive the brake rods $e, e^1,$ and convert the hind wheels into fly wheels in combination with the described means of connecting the parts with the working pistons $l, l,$ when used for the purposes herein set forth.

In witness whereof, I have hereunto set my hand in the city of New York this second day of September one thousand eight hundred and forty five.

ERNEST MARX. [L. S.]

Witnesses:
W. SERRELL,
LEMUEL W. SERRELL.